United States Patent [19]

Ferreira

[11] 4,290,720
[45] Sep. 22, 1981

[54] QUICK SELF-RELEASE AND RELOAD TOOLING DEVICE

[75] Inventor: Roberto J. Ferreira, Bellflower, Calif.

[73] Assignee: R. F. B. Engineering Inc., Garden Grove, Calif.

[21] Appl. No.: 104,111

[22] Filed: Dec. 17, 1979

[51] Int. Cl.³ .................. B23B 5/26; B23B 31/10; B23B 5/22
[52] U.S. Cl. .................................. 409/233; 279/75; 408/239 A
[58] Field of Search ................. 409/233; 279/75; 408/239, 239 A

[56] References Cited

U.S. PATENT DOCUMENTS

| | | | |
|---|---|---|---|
| 3,583,280 | 6/1971 | Hart | 409/233 |
| 3,851,562 | 12/1974 | Tomita et al. | 409/233 |
| 4,075,927 | 2/1978 | Frazier | 409/233 |
| 4,122,755 | 10/1978 | Johnson et al. | 499/233 |
| 4,148,246 | 4/1979 | Johnson et al. | 409/233 |
| 4,188,041 | 2/1980 | Soderberg | 279/75 |

Primary Examiner—Harrison L. Hinson

[57] ABSTRACT

The device is primarily designed to be used with vertical milling machines. This device may also be adapted to any machine tool spindle which uses an internally tapered end to hold the tool holder, collets, etc. etc. Due to the fact that this mechanism functions internally, it does not take away any of the machine's capabilities and no modifications are required to the existing spindle. Basically the device is composed of two major parts: the chuck that goes keyed inside the spindle and the air cylinder which is disposed on the side axially opposite from the chuck and fixed to the body of the machine. The chuck has an axially disposed plunger, a compression spring and two sets of spheres connected by a set of pins. The plunger is shaped to force radially outward a first set of spheres which in turn activates a second set of locking spheres to cause them to move radially inward and engage the tool holder. To release the tool holder the air cylinder actuates a piston rod that compresses the spring which pushes the shaped plunger causing the locking spheres to move radially outward to release the tool holder.

4 Claims, 2 Drawing Figures

QUICK SELF-RELEASE AND RELOAD TOOLING DEVICE

FIELD OF THE INVENTION

This invention relates to such self-release and reload tooling devices and, more particularly, to a device which allows quick changing of cutting tools without stopping the spindle.

BACKGROUND OF THE INVENTION

In the past many devices have been employed in combination with a milling machine which allows one to change tools without shutting down the machine. Besides being slower, these prior arts reduce the capabilities of the machine. Such as in U.S. Pat. Nos. 3,947,047 and U.S. Pat. No. 3,735,993.

OBJECTS OF THIS INVENTION (A) To provide a device which allows safe and quick changing of a cutting tool without having to stop the spindle.

(B) To provide a device which allows quick changing of a cutting tool which is safer and quicker than the prior art devices.

(C) To provide a device which releases a tool with the actuation of an air piston.

(D) To provide a device which allows quick and safe change of a cutting tool, which is compatible with existing milling machines.

(E) To provide a device which allows quick change of the cutting tool, and maintains all of the machine's capabilities. These and other objects and features of advantages will become apparent after one studies the preferred embodiment of my invention, together with the appended drawings.

DETAILED DESCRIPTION OF THE DRAWINGS

Figure 1:
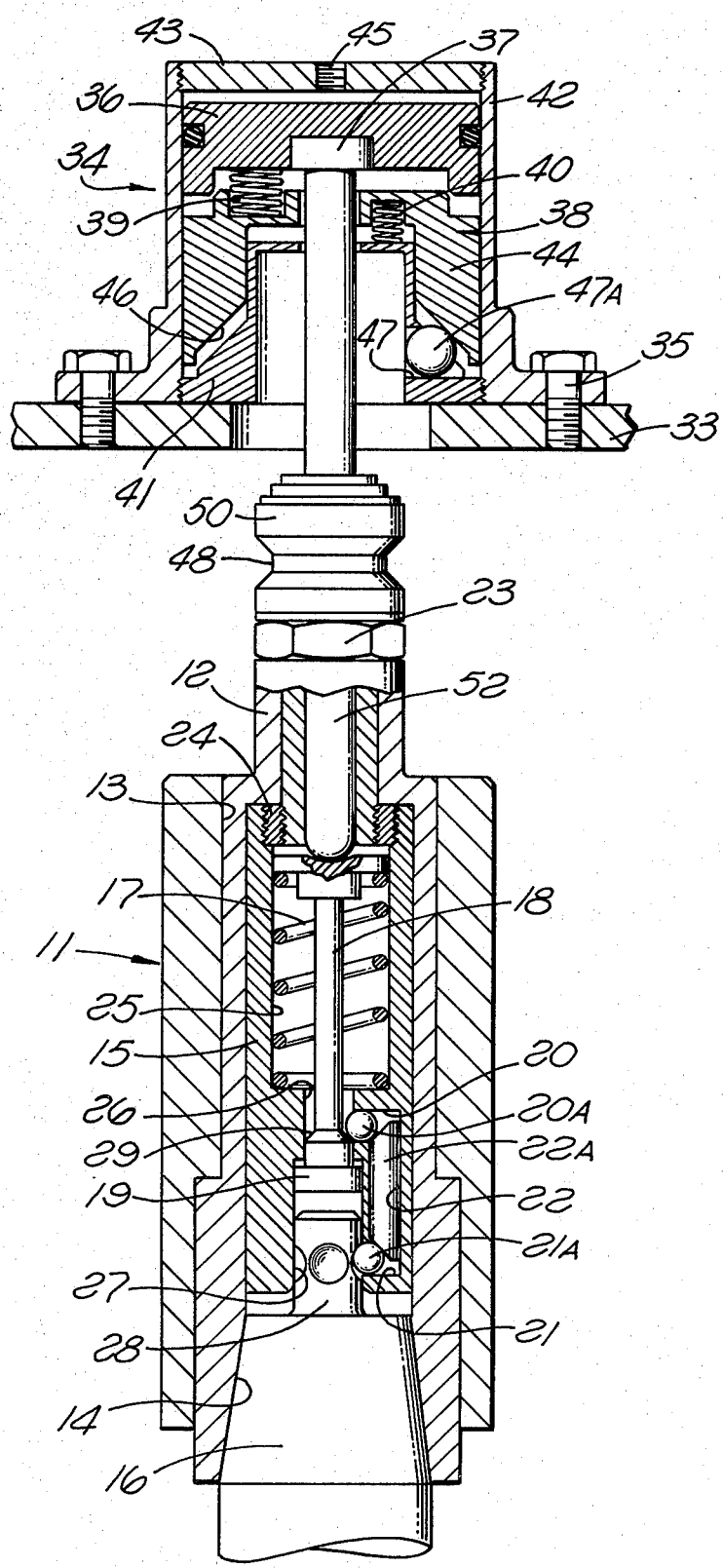
FIG. 1. is a vertical cross-section through a machine tool spindle incorporating the features of my invention, and showing a tool gripped therein ready for a machine operation.

The quill assembly 11 which moves up and down on its axis contains a tubular spindle 12 which rotates about its axis by means of bearings 13 (not showing) like in any well-known vertical milling machine. Within the spindle 12 the cylindrical chuck 15 is radially locked in place by a key (not showing) which is standard on all vertical milling machines, and it is also axially held in place by the draw bar 23. The reducer 24 is primarilly for manufacturing purposes. The cylindrical chamber within the chuck 15 consists of three different diameters 25, 26 and 27 in which there is a spring 17 and a plunger 18 which has a shaped collar 19 at its lower end. Internally around the bore 26 are three openings, such as opening 20 symmetrically spaced, in the bore 27 there is another set of three openings such as opening 21. Said openings 20 and 21 are connected by openings 22. Within each opening 20 is disposed a sphere 20A and also within each opening 21 is disposed a sphere 21A. Inside each opening 22 is disposed a shaped pin 22A for reasons that will become apparent hereinafter. On top of the machine body 33 and axially in line with the quill assembly 11 is disposed an air cylinder assembly 34 suitably bolted by bolts 35. Integral and internally fixed to the cylinder 42 is a cap 43 and a cup 41 whose function will become apparent hereinafter. Within the cylinder 42 an air piston 36 moves axially therein. To piston 36 is fixed an axially disposed pushing rod 37. Between piston 36 and cup 41 is disposed a free piston 38 with an apron 44. One or more compression springs 39 are placed between the piston 36 and the free piston 38 and one or more compression springs 40 are placed between the free piston 38 and cup 41. The combination of springs 39 is designed to have a higher spring constant than the spring constant of the combination of springs 40 for reasons that will also become apparent hereinafter.

OPERATION OF THE DEVICE

Referring to FIG. 1.—When the milling machine is being used for a milling operation. We will note the compression spring 17 is compressed between the shoulder formed by the difference of diameters 25 and 26 and also by the head of the plunger 18. This keeps champher 29 of collar 19 forcing radially outward spheres 20A against another champher 30 formed on pin 22A. This action forces pin 22A downward, therefore; champher 31 of pin 22A forces the spheres 21A radially inward into recess 32 formed on the appendage 28 on the tool holder 16. Since the chuck 15 is keyed to the spindle 12 by well known means (not shown), the chuck 15 and in turn the tool holder 16 rotate whenever the spindle 12 is rotating.

Figure 2:
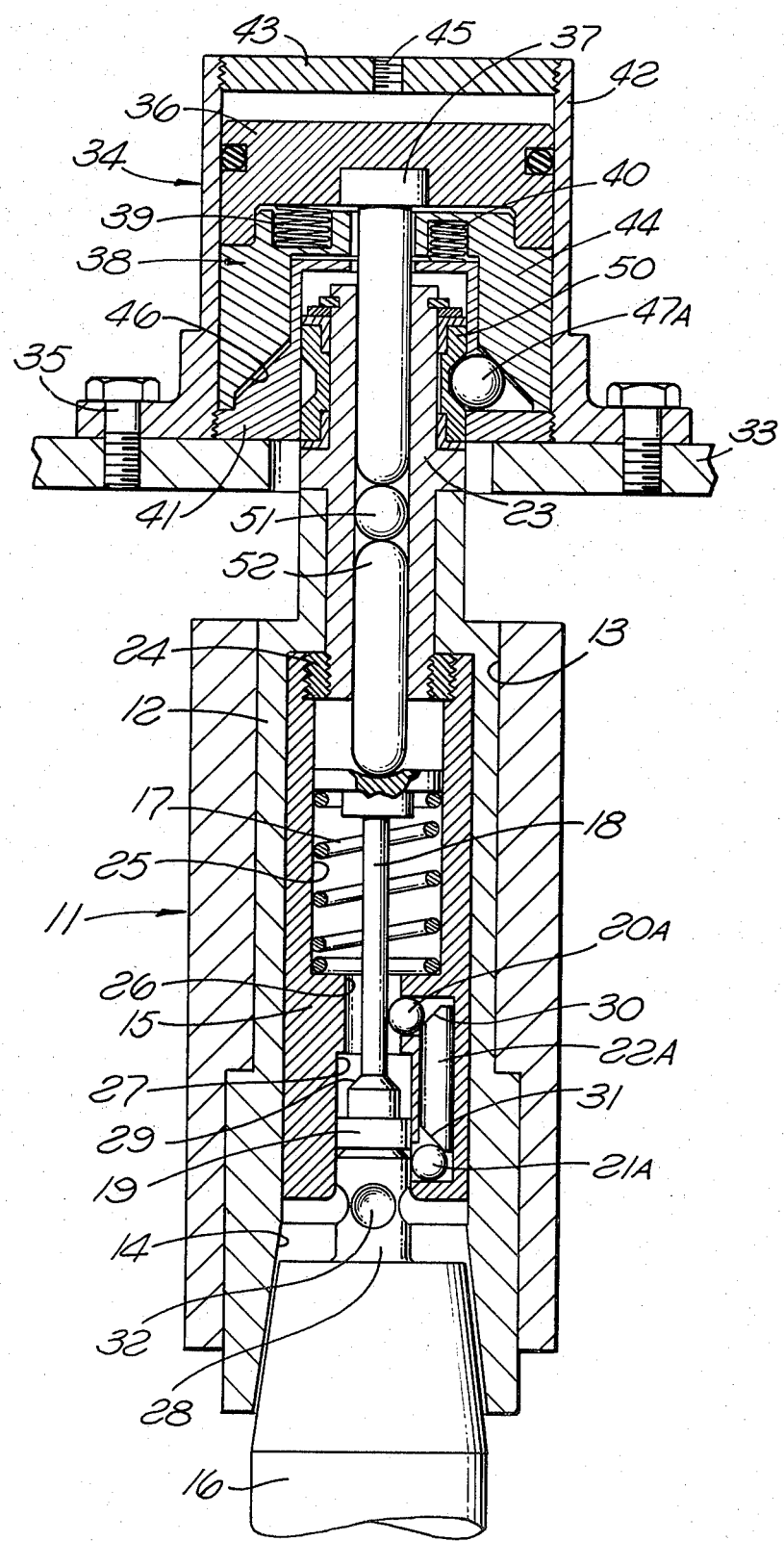
FIG. 2. is also a vertical cross-section through the same machine tool spindle of FIG. 1. showing the spindle right after the tool has been released.

To remove the tool-holder 16 while the spindle 12 is rotating the quill assembly 11 is raised by well-known means to its upper position as shown in FIG. 2.—this causes the free rotating collar 50 to nest within the cup 41 as shown in FIG. 2. To lock the free rotating collar 50 in this position, pressurized air is forced into the cylinder through a suitable valve (not shown) by means of opening 45 causing the air piston 36 to move downward. Due to the fact that the combination of springs 39 is stronger than the combination of springs 40 the free piston 38 also starts to move downward, wherein an internal champher 46 on apron 44 causes spheres 47A to move radially inward within openings 47 into the circumferential groove 48 of the gripper collar 50 on draw bar 23. The quill assembly is now locked and will not move axially, but the spindle 12 is able to keep rotating by means of bushing 49 and collar 50. As the compressed air forces the air piston 36 further downward, the free piston 38 hits bottom causing spring 39 to compress, and rod 37 moves down further, pushing the ball bearing 51 rod 52 and plunger 18. This causes champher 29 of collar 19 to move down and away from sphere 20A so that spheres 21A do not have a firm hold on the recesses 32 of appendage 28 on the tool holder 16. Thus when collar 19 contacts appendage 28 the tool holder 16 is freely pushed out of the tapered socket 14 of the spindle 12. Another tool holder can now be placed into the socket 14 while the spindle 12 is rotating. When air pressure is released the spring 17 returns all parts to working conditions and the quill assembly 11 is again free to move axially.

Having described the preferred embodiment of my invention, one skilled in the art, after studying the above description of the preferred embodiments, could devise other embodiments without departing from the spirit of my invention. Therefore, my invention is not to be considered limited to the described preferred embodiment, but includes all embodiments coming within the scope of my appended claims.

I claim:

1. In a machine tool having a machine body and a rotatable machine spindle, a quick self-release and reload tooling device for a rotatable tool element, tool said device comprising:
   a tool-holder device with an appendage and a plurality of radially disposed recesses on said appendage,
   a tool-holder chuck device with locking means mounted within said machine spindle, said chuck having an axially disposed bore with three different diameters, a spring loaded shaped plunger means disposed within said bore and axially movable therein,
   at least one radially disposed first hole communicating with said axial bore and having a first sphere disposed therein,
   at least one radially disposed second hole axially displaced from said first hole and with said axial bore and having a second sphere disposed therein, axially inward of one end of said chuck, a second bore disposed to communicate with said first and second hole, and a shaped pin disposed in said second bore and disposed to move axially therein, and
   an axially perforated draw bar means with a free rotating gripper collar means,
   disposed on said machine at the other end of said chuck means having an air cylinder means and with locking and pushing means concentric with and axially in line with said spindle means.

2. The tooling device of claim 1, wherein said locking means further comprises:
   a first compression spring means for urging said shaped plunger means for forcing second sphere outward, said shaped pin having a length so that when it is contacted by said second sphere it urges said first sphere radially inward to the radially disposed recesses on the appendage of said tool holder.

3. The tooling device of claim 2, where said locking and pushing means further comprises:
   an actuating piston having a pushing rod coupled thereto, and an apertured cup fixed to said cylinder, said cup having at least one radially disposed third hole and a third sphere disposed within said at least one third hole,
   an apertured free piston disposed to move axially between said actuating piston and said cup,
   an internal chamfer on said free piston capable of surrounding said cup to urge said third sphere radially inward,
   at least one second compression spring means disposed between said actuating piston and said free piston to urge said pistons axially apart,
   at least one third compression spring disposed between said free piston and said cup to urge said free piston and said cup axially apart, said second spring means having a higher spring constant than the spring constant of the said third spring means so that said free piston moves towards said cup before said actuating piston moves towards said free piston, said pushing rod being fixed to said actuating piston and extending through the aperature in said free piston and through the aperature in said cup into the perforation of said perforated draw bar.

4. The tooling of claim 3 further comprising:
   a threaded end and shoulder on said draw bar to lock the said tool-holder chuck to said machine spindle,
   an axially fixed free rotating collar disposed to nest in said aperatured cup,
   a retaining ring to keep the said free rotating collar locked from axial movement,
   said free rotating collar having a circumferential groove to be radially aligned with said at least one third hole when said draw bar means extends to nest into said cup,
   said draw bar having an axially through bore which permits the axial free movement of the pushing rod coupled to the actuating piston,
   an axially free rod disposed within the bore of said draw bar, and
   a friction reducing sphere disposed within said draw bar bore between said free rod and pushing rod coupled to actuating piston.

* * * * *